April 5, 1966 R. A. HATHAWAY 3,244,422

PHONOGRAPHS

Filed Aug. 23, 1963 3 Sheets-Sheet 1

INVENTOR.
Richard A. Hathaway
BY
John J. Pederson
Atty.

INVENTOR.
Richard A. Hathaway
BY John J. Pederson
Atty.

PHONOGRAPHS

Filed Aug. 23, 1963 3 Sheets-Sheet 3

INVENTOR.
Richard A. Hathaway
BY John J. Pederson
Atty.

1

3,244,422

PHONOGRAPHS

Richard A. Hathaway, Des Plaines, Ill., assignor to Zenith Radio Corporation, Chicago, Ill., a corporation of Delaware Filed Aug. 23, 1963, Ser. No. 304,117

13 Claims. (Cl. 274—9)

The present invention is directed to phonographs. Although generally applicable to phonographs of all types, the invention is of special benefit in portable phonographs and other types of phonographs in which compactness is a principal objective.

With the greater demand for higher fidelity and higher quality phonographs, it has become increasingly important to provide protection for the more delicate phonograph components, especially for the phonograph tone arm and stylus. Also, with the growing popularity of portable phonographs, the proper protection of such components has assumed greater importance. The problem has been compounded with the emergence of high-fidelity portable phonographs.

In many applications, it is important to reduce the physical size and weight of the phonograph. In many phonographs, including particularly those embodying the invention described and claimed in the copending application, filed August 23, 1963, Serial Number 304,116 of Maurice E. Hardy for Phonographs and assigned to the same assignee as the present application, the tone arm length is the major limiting factor to reduction in cabinet size. Heretofore, in many phonographs provision has been made for spring captivating the tone arm in its rest position outboard of the turntable. This arrangement has the disadvantage of effectively limiting any reduction in cabinet size because for a minimal cabinet dimension of width or length, the other dimension is effectively determined by the length of the tone arm. And in many cases the spring or springs captivating the tone arm do not hold it with the desired degree of security, for to do so would require a spring or springs of such stiffness as to make securing or releasing of the tone arm unduly difficult. Also, the spring or springs often tend to weaken or loosen after repeated use, thereby decreasing further the protection afforded by such tone arm captivation.

In phonographs of the type described in the above-identified Hardy application, such as those employing an essentially square turntable, there often exists yet another problem: the turntable must be oriented or aligned with its sides parallel to the sides of the cabinet to permit the cabinet to be closed. In such phonographs, it is also often necessary to secure the turntable from motion during transportation of the phonograph to protect the turntable and the cabinet from damage.

Accordingly, it is a principal object of the invention to provide a new and improved phonograph.

It is a further object of the invention to provide a phonograph that avoids one or more of the aforementioned limitations of previous constructions.

It is a more particular object of the invention to provide a phonograph with new and improved provision for tone arm captivation.

It is another object of the invention to provide a phonograph in which the tone arm length does not constitute an effective design limitation with respect to the primary cabinet dimensions.

It is a further object of the invention to provide an improved phonograph in which the turntable may be easily secured against motion in transit.

It is a further object of the invention to provide a phonograph of the type embodying the invention of the above-identified Hardy application, in which the turntable may be easily oriented to a predetermined orientation.

2

A phonograph constructed in accordance with the invention comprises a turntable for supporting a record disc. A tone arm having a portion of predetermined width for seating on a rest post is provided. The tone arm is pivotally supported for movement between a rest position and a playing position. In the rest position the tone arm is clear of the turntable, while in the playing position the tone arm tracks a record disc supported upon the turntable. A movably supported rest post for receiving the tone arm portion in its rest position is provided, and means including the rest post are provided for displacing the tone arm to, and locking it in, a storage position overlying the turntable.

In a preferred embodiment of the invention, the rest post is manually movable from a first position to a second position with the tone arm within it. With a single operation, the phonograph turntable is aligned, oriented, and locked against motion, the rest post is moved over the turntable and the tone arm is similarly moved over the turntable and securely captivated within the rest post. Thus, with one simple and continuous operation, the phonograph is prepared for storage or transportation.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 3, 4, 5A, 5B:
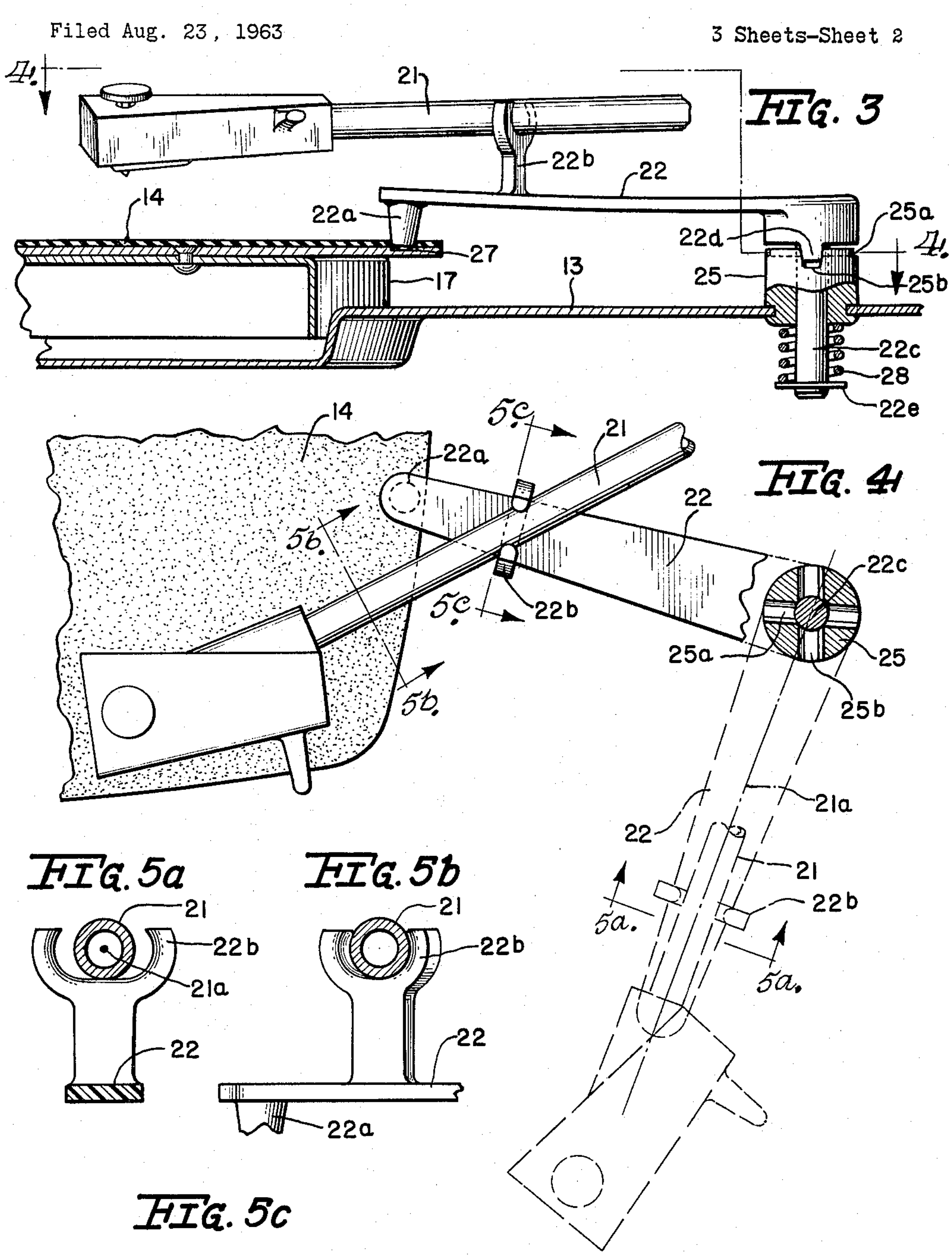
FIGURE 3 is a fragmentary cross-sectional view taken along the line 3—3 in FIGURE 1.
FIGURE 4 is a fragmentary view, partly in cross-section, taken along the line 4—4 in FIGURE 3 with an alternate position of the tone arm shown in dashed outline.
Figures 6, 7:
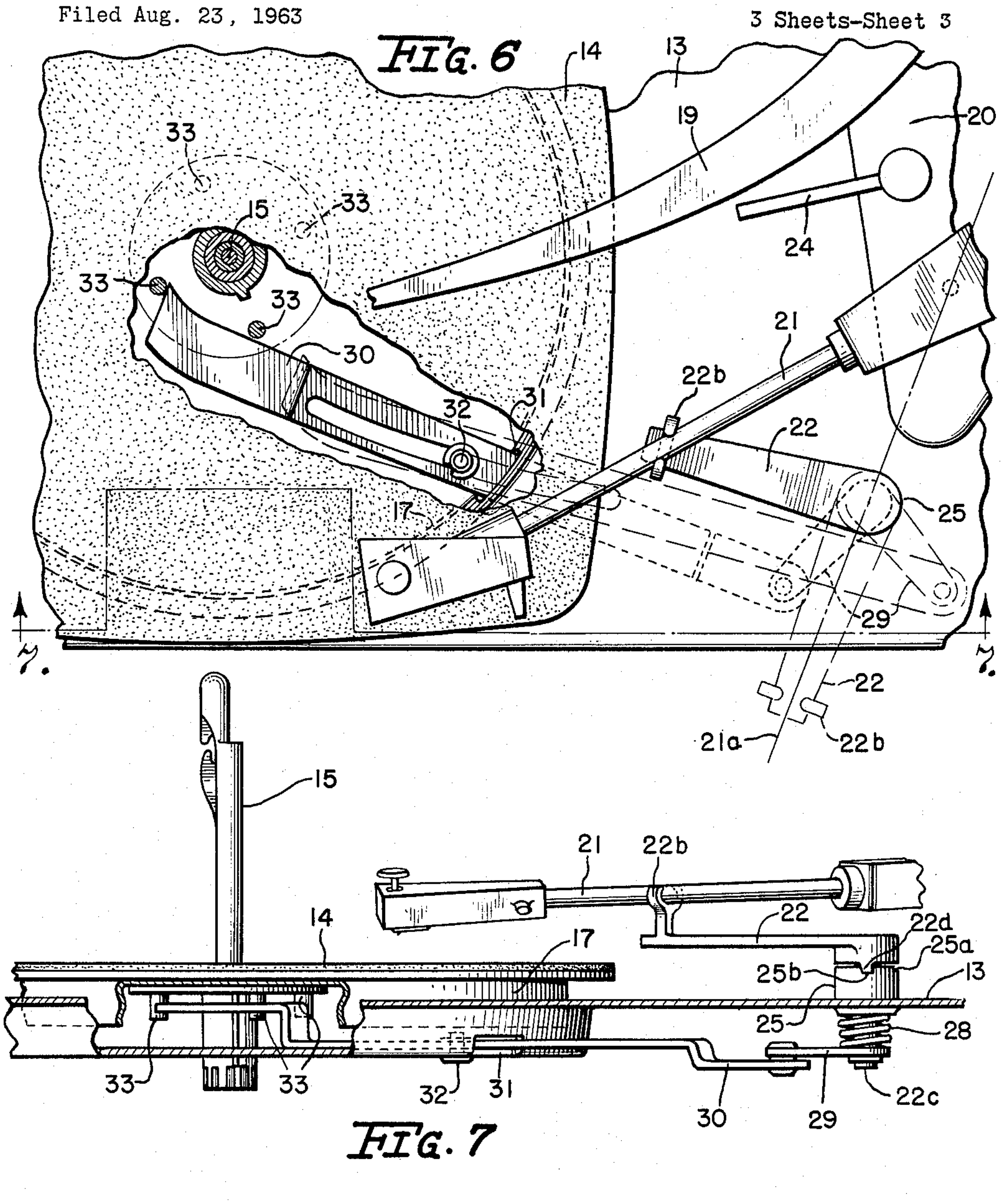

FIGURE *5a* is a fragmentary view, partly in cross-section, taken along the line *5a—5a* in FIGURE 4;

FIGURE *5b* is a fragmentary view, partly in cross-section, taken along the line *5b—5b* in FIGURE 4;

FIGURE *5c* is a fragmentary view, partly in cross-section, taken along line *5c—5c* in FIGURE 4;

FIGURE 6 is a fragmentary plan view of another embodiment of the invention, partly broken away, with alternate positions of certain parts shown in dashed outline; and FIGURE 7 is a fragmentary view, partly in cross-section, taken along the line 7—7 in FIGURE 6.

Figure 1:
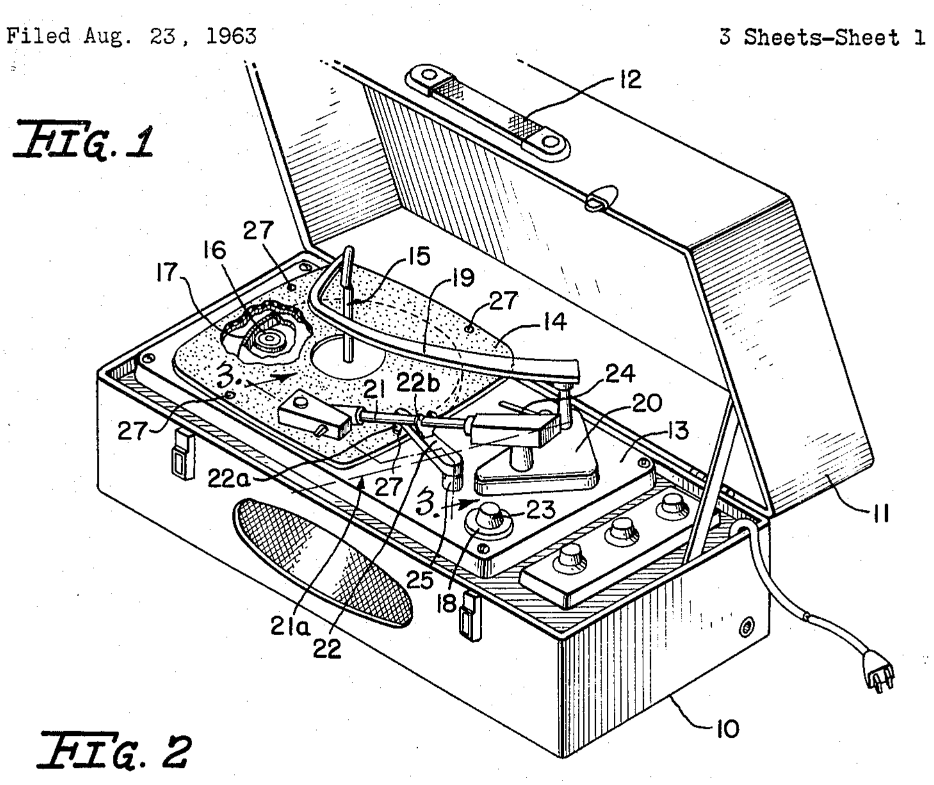
FIGURE 1 is a perspective view of a portable phonograph embodying the present invention with the tone arm captivated and the turntable locked for transportation or storage.

Referring now more particularly to FIGURE 1, the arrangement there represented is a portable phonograph incorporating an automatic record changer. The instrument has a two part housing or cabinet with a base 10 which houses the major components of the instrument such as the record changer mechanism, amplifier and one or more loud speakers, although if the instrument is for stereophonic sound reproduction it may be provided with jacks or other facilities to accommodate remote speakers which may be cable-connected to the amplifier output. The cover 11 may be permanently or removably hinged to the base and the instrument is arranged to have minimal overall physical dimensions. A handle 12 is secured to the cabinet for ease in transporting the instrument.

A mounting plate 13 is affixed to the cabinet base 10. This plate is provided for supporting the operating components of the record changer. Mounting plate 13 has characteristic dimensions less than those of cabinet base 10. Preferably the plate is rectangular to conform in configuration to the cross section of the cabinet and has overall dimensions slightly less than the internal cabinet dimensions. Mounting screws may be provided in the assembly to permit fastening of the mounting plate rigidly within the cabinet when the instrument is being transported, and yet may be released to achieve floating support for the mounting plate when the instrument is being used. This is the conventional practice in phonographs and record changers in high fidelity console units, and accordingly the mounting structure forms no part of the present invention and has not been shown in the drawing in order to simplify the representation.

One of the principal components supported on the upper surface of mounting plate 13 is a turntable 14 of the type described and claimed in the above-identified Hardy application. It is an approximately square unitary plate having a centrally located aperture for receiving a record spindle 15. Turntable 14 has principal orthogonally related characteristic dimensions, its length and width, which are approximately equal to the width of mounting plate 13 and of cabinet base 10. The upper surface of turntable 14 is made of a material, such as rubber, with a high coefficient of friction to avoid slippage of a record disc placed on the turntable during playing of the record disc.

Part of turntable 14 is broken away to show a conventional drive wheel 16 in contact with a circular flange 17 depending from the turntable. Mounting plate 13 has a circular depression or cutout to provide clearance for circular flange 17. Drive wheel 16 is in frictional contact with the vertical inside surface of circular flange 17, and is axially affixed to the drive shaft of the actuating motor (not shown). Drive wheel 16 and the driving motor may form part of a well known and conventional driving mechanism, which mechanism may include a conventional speed changing device to permit adjustment of the turntable speed to accommodate different types of commercially available record discs. A manually operable speed selector knob 18 is shown mounted on the mounting plate in a conventional manner.

It is to be noted that with the turntable in the orientation shown, that is with its sides approximately parallel to the sides of the cabinet, the cabinet cover may be closed while in other orientations it may not. This is a feature of the above-mentioned Hardy invention that allows a smaller width dimension for the cabinet and emphasizes the importance of the tone arm length in determining the minimum usable cabinet dimensions.

The mechanical and operating details of the mechanism for changing records may be completely conventional and constitute no part of the present invention. It, therefore, has not been deemed necessary to show any more of that mechanism than appears upon observation of the phonograph with the cover open. The visible record changing structure comprises the record spindle 15 which projects from the central aperture of the turntable 14. This spindle is of the record storing and feeding type with a shelf section near its upper extremity upon which a stack of records, threaded over the free end of the spindle, rests, waiting to be fed one a a time to the turntable. A pressure arm 19 is pivotally supported from an outboard stanchion 20 for bearing on the uppermost record of the stack to retain the records in position on the spindle shelf, in conventional fashion.

There is a tone arm 21 which is conventionally supported for pivotal motion in both horizontal and vertical planes from structures that are also accommodated by stanchion 20. Tone arm 21 has a portion for seating on a rest post 22. Tone arm 21 is pivotally supported for angular displacement between a rest position outboard and clear of the turntable along the axis 21*a*, represented by a dashed line and a playing position in which the tone arm tracks a record disc supported on the turntable.

There are the customary two controls on the mounting plate; one the manual speed selector switch and the other an off-on-record changing cycle switch. They are shown as concentrically arranged with an outer knob 18 as the speed control and an inner knob 23 as the off-on-cycle switch.

Also projecting upwardly from mounting plate 13 is a conventional flag or sensing device 24 that conditions the record changer and its control of the tone arm in accordance with the diameter of the record to be played.

Figure 2:
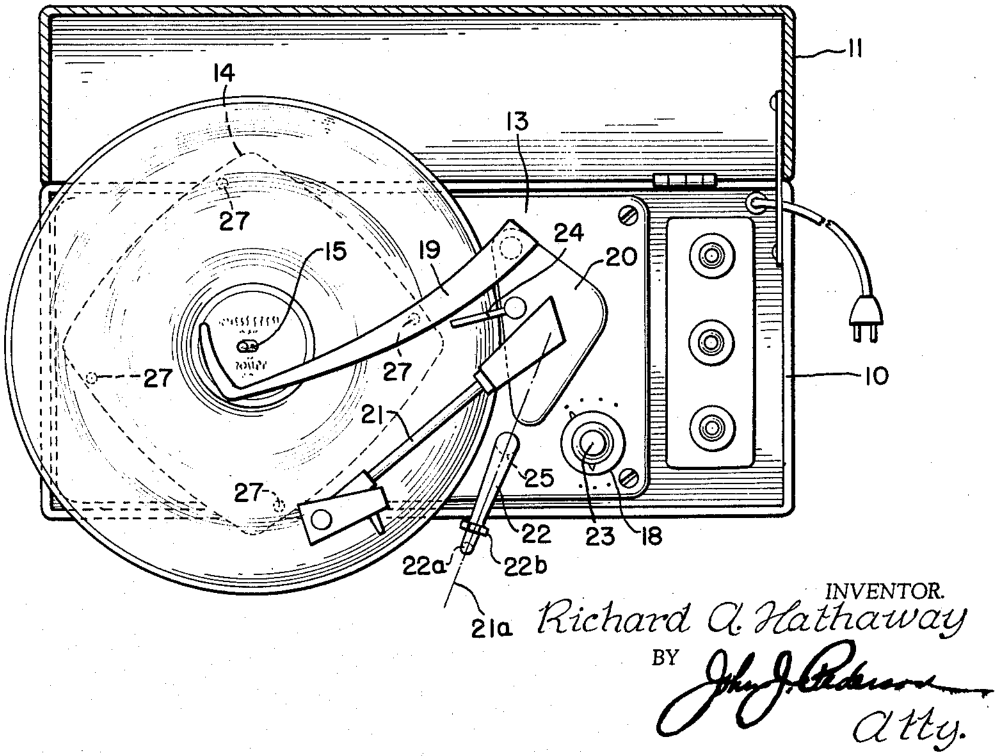
FIGURE 2 is a plan view partly in cross-section of the phonograph of FIGURE 1, with the tone arm tracking a record disc and the rest post oriented to receive the tone arm in its rest position.

In accordance with the invention, rest post 22 is of a unique configuration. It comprises a lever pivotally mounted (in a manner to be described in connection with FIGURES 3 and 4) on a bearing sleeve 25 affixed to mounting plate 13 near stanchion 20. The rest post is mounted for movement between two primary functional positions pivotally displaced from each other. In the first or playing position the rest post is outboard of the turntable and collinear with tone arm rest position (axis 21*a*), as shown in FIGURE 2. In the second or storage position the rest post is inboard and over the turntable, as shown in FIGURE 1. These two primary positions of the rest post are displaced from each other by approximately a right angle. Near the angularly displaced end of the rest post, a depending pad 22*a* is provided. When the rest post is in its second or storage position, pad 22*a* is in contact and bearing upon the upper surface of turntable 14. The lower end of pad 22*a* can rest within a small depression or aperture 27 which may be provided in the upper surface of turntable 14 for receiving pad 22*a*. Four such apertures 27 may be located on the turntable, one near each corner thereof, in such a manner that one of the apertures is vertically aligned with pad 22*a* when rest post 22 is in its second or storage position and the turntable is oriented in one of the four positions in which its sides are approximately parallel to the sides of cabinet base 10.

A generally U-shaped saddle 22*b* is affixed on the upper surface of the lever arm near pad 22*a*. Saddle 22*b* is wider than a portion of tone arm 21 to receive the latter freely when in its rest position, but is of an effective width approximately equal to that of tone arm 21 when in its storage position, as hereinafter described in greater detail.

In FIGURE 3, a preferred pivotal mounting construction for yieldably restraining or detenting rest post 22 in either of its two functional positions is depicted. A pivot pin 22*c* affixed to and depending from rest post 22 is rotatably received in bearing sleeve 25 which is affixed to mounting plate 13. The rest post has a key 22*d* for dropping into either of two keyways 25*a* and 25*b* at the top of the bearing sleeve. Keyways 25*b* and 25*a* are circumferentially oriented to establish the two desired functional positions of the rest post. A captivated spiral spring 28 surrounds pivot pin 22*c*. Spring 28 is maintained in compression and bears against the bottom of the bearing sleeve 25 and against a washer 22*e* captivated near the lower end of the pivot pin 22*c*, providing a downward pressure on the rest post to urge and hold key 22*d* in keyway 25*a* or keyway 25*b* of sleeve 25. As the rest post key 22*d* drops into the keyway 25*b* in sleeve 25 depending pad 22*a* is pulled downwardly into engagement with turntable 14.

The operating aspects of the phonograph except for the specifications of the rest post and turntable are conventional. In operation, pressure arm 19 is swung in a counterclockwise direction to its extreme position which gives free access to the spindle in order that a stack of records may be threaded there over and placed upon the shelf of spindle 15. Thereafter, the pressure arm is returned to the position above the turnable center, over and bearing upon the uppermost record to stabilize the record stack. If control knob 18 adjusted to the proper speed, and control knob 23 is manipulated, the record changer is turned on and a record change cycle is initiated. This results in the lowermost record of the stack being delivered to the turntable after which tone arm 21 is set down in the first or lead-in groove of the record, and the reproduction takes place in the usual way. After the record has been played, the tone arm returns to its rest position and the second record change cycle is instituted. This procedure is repeated until all records of the stack have been played; the instrument may be provided with an automatic shut-off mechanism as is well known in the art.

Figure 5C:
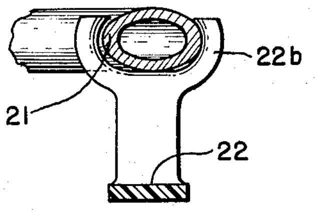

After the playing of the final record the tone arm 21 is in its rest position and the record changer is turned off. The phonograph is in the condition shown in FIGURE 2, but with the tone arm 21 in its rest position along axis 21*a* as illustrated in dotted outline in FIGURE 4. To prepare the phonograph for storage, after removing the records from the spindle and replacing the pressure arm 19 in its standard storage position, as shown, the rest post with tone arm 21 resting within saddle 22*b* is pivotally displaced from its position outboard of the turntable and collinear with axis 21*a* (as shown in dashed lines in FIGURE 4) to the second or storage position of rest post 22, inboard and overlying turntable 14 (shown in solid lines in FIGURE 4). In so doing the rest post key 22*d* is advanced out of keyway 25*a* in bearing sleeve 25 and displaced until it reaches and enters keyway 25*b*. Key 22*d* and rest post 22 are urged and held downward by spring 28. At the same time that key 22*d* drops into keyway 25*b*, the depending pad 22*a* drops onto the turntable surface, bearing upon the turntable and restraining it from motion. And, as rest post 22 is angularly displaced, the effective width of U-shaped saddle 22b, as seen along the axis of tone arm 21, is decreased from a substantially greater width (as shown in FIGURE 5*a*) to approximately the width of tone arm 21, (as shown in FIGURES 5*b* and 5*c*). In this manner tone arm 21 is captivated within saddle 22*b*.

In so angularly displacing the rest post and tone arm the angle between the plane of the U-shaped saddle 22*b* and the axis of the tone arm 21 decreases from approximately 90° to approximately 45°, thus reducing the effective width of the saddle by approximately one-third. If desired, saddle 22*b* may be made of or lined with nylon or other resilient material and rest post proportioned so as to reduce the effective width of the saddle to a dimension slightly less than the tone arm thickness when in the storage position. This construction causes the tone arm to be captivated by the clamping action of the slightly deformed saddle or saddle lining, as well as by entrapment and friction. With the described construction, saddle 22*b* is approximately fifty percent wider than the tone arm thickness when in its rest position, allowing for considerable "rideover" or misplacement of the tone arm from its nominal rest position as encountered with many automatic record changer constructions.

In one simple continous operation, rest post 22 and tone arm 21 are thus displaced from a position outboard and hanging over the edge of mounting plate 13 and cabinet base 10 to a position inboard and overlaying turntable 14, thereby captivating tone arm 21 and restraining turntable 14 from motion. The turntable need be aligned, which may be done by simply rotating it until pad 22*d* drops into an aperture 27. Aperture 27 may be omitted, in which event the turntable may be aligned by eye. With this completed, cover 11 may be closed to finish the preparation of the phonograph for storage or transportation.

To prepare the phonograph for operation, the operator need only open the cover and angularly displace the rest post from the storage position to the operating position collinear with axis 21*a*. By this operation the tone arm and turntable are freed from captivation, and the phonograph may be operated in the conventional manner.

Referring now to a preferred embodiment of the invention shown in FIGURES 6 and 7 the phonograph there depicted has conventional provisions similar to those found in the phonograph of the FIGURES 1 and 2, including mounting plate 13, turntable 14, record spindle 15, pressure arm 19, stanchion 20 supporting pressure arm 19, tone arm 21 and flag or sensing device 24. In accordance with the invention, the phonograph is provided with a rest post 22 similar to that of the previous embodiment but without the depending pad of the previous embodiment. It has a U-shaped saddle 22*b* and a depending pivot pin 22*c* seated in a bearing sleeve 25 and extending through and below the bearing sleeve. The rest post 22 is shown in its second or captivating position with the tone arm captivated in the U-shaped saddle 22*b*. In addition to the aforementioned members, a lever arm 29 is rigidly affixed near the depending end of pivot pin 22*c* on the underside of bearing sleeve 25 and mounting plate 13. Arm 29 lies in a plane approximately parallel to the mounting plate surface, and in a position in that plane determined by the orientation of the rest post. An orienting lever 30 is pivotally affixed to arm 29 near its end away from pivot pin 22*c* and orienting lever 30 also lies generally parallel to the mounting plate surface. Lever 30 extends through an aperture 31 in the depression in mounting plate 13 which is provided for receiving driving flange 17 of turntable 14. Orienting lever 30 is slidably affixed to the mounting plate by a guiding member 32. An elongated slot is provided in orienting lever 30 for receiving member 32. This slot and member together with arm 29 fully determine the ambit of possible positions of lever 30. With the rest post in its second or locking position (as shown in solid lines in FIGURE 6) lever 30 is in contact with two of four orientation stops 33 which depend from turntable 14 and are affixed to the turntable equidistantly about a circle whose center is at the center of the turntable. One of the stops is in contact with the leading edge and the other with the side of lever 30. In this position the turntable is locked from rotational movement in an alignment or orientation determined by the position of lever 30 and the two stops 33 with which it is in contact.

A second position of the mechanism is shown in dashed outline in FIGURE 6. In this position rest post 22 has been angularly displaced to its open or first position approximately collinear with axis 21*a*, the rest position of tone arm 21. Arm 29 being rigidly affixed to pin 22*c* of rest post 22, is in a corresponding angularly displaced position from its previous position. In this position of arm 29 the orienting lever 30 is slidably displaced away from and free of orientation stops 33 so that turntable 14 is free to rotate.

The rest post 22 and the arm 29 are held in their two primary positions by the key 22*d* resting in either of keyway 25*a* or keyway 25*b* in the bearing sleeve 25 in a manner similar to the previous embodiment.

In preparing the phonograph for operation from the second or locked position shown in FIGURE 7 and in solid lines in FIGURE 6, the user manually moves the rest post pivotally displacing it about its pivot in bearing sleeve 25 to an open or first position shown in dashed outline in FIGURE 6. In angularly displacing rest post 22, key 22*d* is withdrawn from keyway 25*b* and moved along upper surface of bearing sleeve 25 until it reaches keyway 25*a* corresponding to the open position of rest post 22. The key is urged down into keyway 25*a* by the compression force of spring 28 (shown in FIGURE 7) in a manner similar to that described in the first embodiment. As the rest post is angularly displaced, arm 29 is also angularly displaced by the same angle as the rest post. Arm 29, in turn slides lever 30 from the stops 33, along a path defined by the arc of arm 29. With rest post 22 in its open or first position, orienting lever 30 is free of the stops, thereby allowing the turntable to rotate freely.

In this single manual operation the user has changed the phonograph from a locked or storaged state to an open state, ready for operation. After the user has finished using the phonograph and removed the records, the phonograph may be prepared for storage and transportation by a similar single movement of the rest post. The user need only manually move the rest post with the tone arm seated within saddle 22*b* from its first or open position (shown in dashed lines in FIGURE 6) in which it freely receives the tone arm to its second or closed position. This angular displacement of rest post 22 captivates tone arm 21 within saddle 22*b* and angularly displaces arm 29 to its closed position (as shown in solid lines in FIGURE 6). In so advancing, arm 29 advances lever 30, sliding it toward and through the circular path of the stops 33. As the lever advances into the circular path it contacts one of the stops 33 of turntable 14. As lever 30 continues its advance along the path predetermined by the arc of arm 29 and the guiding slot of lever 30, it angularly displaces the contacted stop 33 along the circumference of the circle about which the four stops 33 are affixed. Turntable 14 is likewise angularly displaced by the advance of the stops. Turntable 14 continues to revolve until a second stop advances into contact with the side of the orientation lever. When this occurs, turntable 14 is securely locked from rotation in either direction. Turntable 14 is locked in one of four positions determined by the contacted stops and the orientation lever position. The stops 33 are affixed so that in each of these four possible positions turntable 14 is oriented with its sides approximately parallel to the sides of the cabinet. It should be noted that it does not matter what orientation the turntable was in when lever 30 advanced through the circular path, since contact with one of the stops has to be made somewhere along lever 30 path. And once contact is made lever 30 advances the stop until the turntable is securely locked and oriented.

Thus, the preferred embodiment of FIGURES 6 and 7, provides for simple, single step preparation of the phonograph for either playing or storage. In preparing the phonograph for playing, the operator need only angularly displace the rest post outward from its detented storage position to its detented playing position; by this single operation the tone arm is decaptivated and placed in its rest position and the turntable is freed for rotation. To prepare the phonograph for storage or transportation the operator need only angularly displace the rest post to its former position, in which the tone arm is captivated and positioned inboard of the turntable, and the turntable is both oriented and locked.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A phonograph comprising:
a turntable for supporting record discs;
a tone arm, having a portion of predetermined width, pivotally supported for movement between a rest position in which said tone arm is clear of said turntable and a playing position in which said tone arm tracks a record disc supported upon said turntable;
a pivotally supported rest post for receiving said tone arm portion in its rest position;
and means including said rest post for displacing said tone arm to a storage position overlying said turntable and for locking said tone arm in said storage position.

2. A phonograph comprising:
a turntable for supporting a record disc;
a tone arm, having a portion of predetermined width, pivotally supported for movement between a rest position in which said tone arm is clear of said turntable and a playing position in which said tone arm tracks a record disc supported upon said turntable;
and a rest post having a generally U-shaped saddle which is wider than said tone-arm portion, said rest post being supported for movement between a first position in which said saddle freely receives said tone-arm portion as said tone arm assumes its rest position and a second position in which the effective width of said saddle, viewed along the axis of said tone arm, is approximately equal to that of said tone-arm portion.

3. A ponograph comprising:
a turntable for supporting a record disc;
a tone arm, having a portion of predetermined width, pivotally supported for movement between a rest position in which said tone arm is clear of said turntable and a playing position in which said tone arm tracks a record disc supported upon said turntable;
a rest post having a generally U-shaped saddle with bowed arm sections which define an access opening that is wider than said tone-arm portion;
and means for supporting said rest post for movement between a first position in which said saddle freely receives said tone-arm portion as said tone arm assumes its rest position and a second position in which said tone arm is pivotally displaced from said rest position and in which the effective width of said saddle, viewed along the axis of said tone arm, is approximately equal to that of said tone-arm portion to captivate said tone-arm portion within said saddle.

4. A phonograph comprising:
a turntable for supporting a record disc;
a tone arm, having a portion of predetermined width, pivotally supported for movement between a rest position in which said tone arm is clear of said turntable and a playing position in which said tone arm tracks a record disc supported upon said turntable;
and a rest post comprising a lever pivoted at one end and bearing near its opposite end a generally U-shaped saddle which is wider than said tone-arm portion, said rest post being movable from a first position in which said lever is substantially collinear with said rest position of said tone arm with its pivoted end closer to the pivot of said tone arm to receive said tone arm portion freely, and a second position in which said tone arm is pivotally displaced from said rest position and in which the effective width of said saddle, viewed along the axis of said tone arm, is approximately equal to that of said tone-arm portion to captivate said tone-arm portion within said saddle.

5. A phonograph comprising:
a turntable for supporting a record disc;
a tone arm, having a portion of predetermined width, pivotally supported for movement between a rest position in which said tone arm is clear of said turntable and playing position in which said tone arm tracks a record disc supported upon taid turntable;
a rest post having a generally U-shaped saddle which is wider than said tone-arm portion;
means for supporting said rest post for movement between a first position in which said saddle freely receives said tone-arm portion as said tone arm assumes its rest position and a second position in which said tone arm is pivotally displaced from said rest position and in which the effective width of said saddle, viewed along the axis of said tone arm, is approximately equal to that of said tone-arm portion to captivate said tone-arm portion within said saddle;

and releasable locking means for yieldably retaining said rest post in either of its aforesaid positions.

6. A phonograph comprising:

a turntable for supporting a record disc;

a tone arm, having a portion of predetermined width, pivotally supported for movement between a rest position in which said tone arm is clear of said turntable and a playing position in which said tone arm tracks a record disc supported upon said turntable;

a rest post comprising a lever pivoted at one end and bearing near its opposite end a generally U-shaped saddle which is wider than said tone-arm portion;

means for supporting said rest post for pivotal movement from a first position in which said lever is substantially coplanar with said rest position of said tone arm with its pivoted end closer to the pivot of said tone arm to receive said tone-arm portion freely and a second position in which said tone arm is pivotally displaced from said rest position to a position overlying said turntable and in which the effective width of said saddle, viewed along the axis of said tone arm, is approximately equal to that of said tone-arm portion to captivate said tone-arm portion within said saddle;

and a retaining pad depending from said lever to engage said turntable and restrain the latter against movement during intervals in which said rest post is in its aforesaid second position.

7. A phonograph comprising:

a turntable for supporting a record disc;

a tone arm, having a portion of predetermined width, pivotally supported for movement between a rest position in which said tone arm is clear of said turntable and a playing position in which said tone arm tracks a record disc supported upon said turntable;

a rest post comprising a lever bearing a depending pivot pin at one end and bearing near its opposite end an upstanding generally U-shaped saddle which is wider than said tone-arm portion;

means including a vertical thrust bearing sleeve for receiving said pivot pin and supporting said rest post for pivotal movement from a first position in which said lever is substantially coplanar with said rest position of said tone arm with its pivoted end closer to the pivot of said tone arm to recieve said tone-arm portion freely and a second position in which said tone arm is pivotally displaced from said rest position to a position overlying said turntable and and in which the effective width of said saddle, viewed along the axis of said tone arm, is approximately equal to that of said tone-arm portion to captivate said rest post portion within said saddle:

a key on said pivot pin;

a keyway in said sleeve for receiving said key to permit said pivot pin to drop as said rest post assumes its aforesaid second position;

and a retaining pad depending from said lever to engage and restrain said turntable against movement as said pivot pin descends into said sleeve.

8. A phonograph comprising, within a cabinet:

a record playing mechanism including a substantially square turntable for supporting a record disc, a tone arm supported for pivotal movement between a rest position and a playing position, and a rest post for receiving said tone arm in said rest position;

and means coupled to said record playing mechanism for orienting said turntable in a predetermined position relative to said cabinet and for captivating said turntable in said predetermined position.

9. A phonograph comprising:

a turntable for supporting record discs;

a tone arm, having a portion of predetermined width, pivotally supported for movement between a rest position in which said tone arm is clear of said turntable and a playing position in which said tone arm tracks a record disc supported upon said turntable;

a pivotally supported rest post for receiving said tone arm portion in its rest position;

means including said rest post for displacing said tone arm to a storage position overlying said turntable and for locking said tone arm in said rest position;

and means coupled to said last mentioned means for locking said turntable in a predetermined orientation when said tone arm is in said storage position.

10. A phonograph comprising:

a turntable for supporting a record disc;

a tone arm, having a portion of predetermined width, pivotally supported for movement between a rest position in which said tone arm is clear of said turntable and a playing position in which said tone arm tracks a record disc supported upon said turntable;

a rest post having a generally U-shaped saddle which is wider than said tone-arm portion;

means for supporting said rest post for movement between a first position in which said saddle freely receives said tone-arm portion as said tone arm assumes its rest position and a second position in which said tone arm is pivotally displaced from said rest position and in which the effective width of said saddle, viewed along the axis of said tone arm, is approximately equal to that of said tone-arm portion to captivate said tone-arm portion within said saddle;

and means, responsive to movement of said rest post to said second position, for locking said turntable against movement.

11. A phonograph comprising:

a substantially square turntable for supporting a record disc;

a tone arm, having a portion of predetermined width, pivotally supported for movement between a rest position in which said tone arm is clear of said turntable and a playing position in which said tone arm tracks a record disc supported upon said turntable;

a rest post having a generally U-shaped saddle which is wider than said tone-arm portion, said rest post being supported for movement between a first position in which said saddle freely receives said tone-arm portion as said tone arm assumes its rest position and a second position in which said tone arm is pivotally displaced from said rest position and in which the effective width of said saddle, viewed along the axis of said tone-arm portion, is approximately equal to that of said tone-arm portion to captivate said tone-arm portion within said saddle;

and means, responsive to movement of said rest post to said second position, for locking said turntable in a predetermined orientation.

12. A phonograph comprising:

a substantially square turntable for supporting a record disc and having a plurality of positioning stops depending from said turntable and spaced equidistantly about a circular path concentric with the axis of said turntable;

a tone arm, having a portion of predetermined width, pivotally supported for movement between a rest position in which said tone arm is clear of said turntable and a playing position in which said tone arm tracks a record disc supported upon said turntable;

a rest post having a generally U-shaped saddle which is wider than said tone-arm portion;

means for supporting said rest post for movement between a first position in which said saddle freely receives said tone-arm portion as said tone arm assumes its rest position and a second position in which said tone arm is pivotally displaced from said rest position and in which the effective width of said saddle, viewed along the axis of said tone arm, is approximately equal to that of said tone-arm portion to captivate said tone-arm portion within said saddle;

and an orientation lever coupled to said rest post and responsive to movement thereof to said second position for engaging one of said stops to lock said turntable in a predetermined orientation.

13. A phonograph comprising:

a substantially square turntable for supporting a record disc;

means for playing said record disc including a tone arm pivotally supported for movement between a rest position in which said tone arm is clear of said turntable and a playing position tracking said record disc;

and means comprising a locking element adapted to engage said turntable and said tone arm for locking said turntable in a predetermined orientation and for simultaneously captivating said tone arm in a storage position overlying said turntable.

References Cited by the Examiner

UNITED STATES PATENTS 2,583,845 1/1952 Holik ---------------- 274—1

FOREIGN PATENTS 112,037 10/1925 Switzerland.

NORTON ANSHER, *Primary Examiner*.